United States Patent
Darrow, Jr. et al.

(10) Patent No.: US 10,301,012 B2
(45) Date of Patent: May 28, 2019

(54) ROTOR HUB FOR ROTARY WING AIRCRAFT

(71) Applicant: Sikorsky Aircraft Corporation, Stratford, CT (US)

(72) Inventors: David A. Darrow, Jr., Stratford, CT (US); Kevin Laitenberger, Beacon Falls, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 268 days.

(21) Appl. No.: 14/915,093

(22) PCT Filed: Mar. 19, 2014

(86) PCT No.: PCT/US2014/031211
§ 371 (c)(1),
(2) Date: Feb. 26, 2016

(87) PCT Pub. No.: WO2015/030868
PCT Pub. Date: Mar. 5, 2015

(65) Prior Publication Data
US 2016/0207620 A1  Jul. 21, 2016

Related U.S. Application Data

(60) Provisional application No. 61/871,197, filed on Aug. 28, 2013.

(51) Int. Cl.
*B64C 11/04* (2006.01)
*B64C 27/48* (2006.01)
(Continued)

(52) U.S. Cl.
CPC .............. *B64C 27/32* (2013.01); *B64C 11/04* (2013.01); *B64C 27/33* (2013.01); *B64C 27/48* (2013.01); *B64C 27/10* (2013.01); *B64C 27/35* (2013.01)

(58) Field of Classification Search
CPC ......... B64C 27/32; B64C 11/04; B64C 11/06; B64C 27/33; B64C 27/48; B64C 27/10; B64C 27/35
(Continued)

(56) References Cited

U.S. PATENT DOCUMENTS 3,695,779 A   10/1972   Kastan et al.
3,918,836 A   11/1975   Johnson et al.
(Continued)

FOREIGN PATENT DOCUMENTS

DE   3104682 A1   9/1982
EP    315962 A2   5/1989
(Continued)

OTHER PUBLICATIONS

International Search Report and Written Opinion dated Aug. 27, 2014 in corresponding PCT Application No. US2014/031211.
(Continued)

*Primary Examiner* — Carlos A Rivera
*Assistant Examiner* — Justin A Pruitt
(74) *Attorney, Agent, or Firm* — Cantor Colburn LLP (57) ABSTRACT

A rotor hub assembly for a rotary-winged aircraft includes a spool portion and a plurality of hub arms extending radially outwardly from the spool portion. A rotor blade is connectable to each hub arm. Each hub arm includes a spine portion and at least two leg portions extending from the spine portion. The spine portion and the at least two leg portions defining an I-shaped cross-section of each hub arm. A rotor assembly includes a rotor hub assembly including a spool portion and a plurality of hub arms extending radially outwardly from the spool portion. Each hub arm includes a spine portion and at least two leg portions extending from the spine portion. The spine portion and the at least two leg (Continued)

portions define an I-shaped cross-section of each hub arm. A rotor blade is secured to each hub arm.

16 Claims, 6 Drawing Sheets

(51) Int. Cl.
*B64C 27/32* (2006.01)
*B64C 27/33* (2006.01)
*B64C 27/10* (2006.01)
*B64C 27/35* (2006.01)

(58) Field of Classification Search
USPC ........... 416/128, 129, 135, 140, 141; 244/60
See application file for complete search history.

(56) References Cited

U.S. PATENT DOCUMENTS

| | | |
|---|---|---|
| 4,111,605 A | 9/1978 | Roman et al. |
| 4,326,834 A | 4/1982 | Ostrowski |
| 4,466,774 A | 8/1984 | Cycon et al. |
| 4,568,245 A | 2/1986 | Hibyan et al. |
| 4,741,671 A | 5/1988 | Anamateros et al. |
| 7,686,584 B2 | 3/2010 | Schmaling |
| 2010/0034654 A1 | 2/2010 | Muylaert et al. |

FOREIGN PATENT DOCUMENTS

| | | |
|---|---|---|
| EP | 0549455 A1 | 6/1993 |
| EP | 1088754 A2 | 4/2001 |
| GB | 2160619 A | 12/1985 |

OTHER PUBLICATIONS

Aviation Images—Aircraft in Detail, "Helicopter Rotorhead Gallery", downloaded from http://www.b-domke.de/AviationImages/Rotorhead.html on Oct. 30, 2013, 29 pages.
Tim McAdams, "Starflex Rotor", AOPA Hover Power, May 25, 2011, 4 pages.
Wikipedia, "Helicopter Rotor", downloaded from http://en.wikipedia.org/wiki/Helicopter_rotor on Oct. 30, 2013, 9 pages.
ESSR; PCT/US2014031211, dated Jul. 4, 2017; 7 pages.

ROTOR HUB FOR ROTARY WING AIRCRAFT

CROSS-REFERENCE TO RELATED APPLICATIONS

This application claims the benefit of PCT Application No. US2014/031211, filed Mar. 19, 2014, which in turn claims priority to U.S. provisional patent application Ser. No. 61/871,197, filed Aug. 28, 2013. The entire contents of PCT Application No. US2014/031211 and U.S. provisional patent application Ser. No. 61/871,197 are incorporated herein by reference.

FEDERAL RESEARCH STATEMENT

This invention was made under Technology Investment Agreement No. W911 W6-13-2-0003 with the United States Army. The Government has certain rights to the invention.

BACKGROUND

The subject matter disclosed herein generally relates to rotor assemblies for aircraft use. More specifically, the subject disclosure relates to rotor hubs for rigid rotor rotorcraft.

A rotary wing aircraft with a coaxial contra-rotating rotor system is capable of higher speeds as compared to conventional single rotor helicopters due in part to the balance of lift between advancing sides of the main rotor blades on the upper and lower rotor systems. To increase rotor speeds and reduce drag, it is desired to place the rotor assemblies of the coaxial rotor system closer to one another along the rotor axis to reduce drag on the system. In some aircraft this results in the use of a rigid rotor system, one without blade flap or blade lead/lag adjustment.

BRIEF SUMMARY

In one embodiment, a rotor hub assembly for a rotary-winged aircraft includes a spool portion and a plurality of hub arms extending radially outwardly from the spool portion. A rotor blade is connectable to each hub arm. Each hub arm includes a spine portion and at least two leg portions extending from the spine portion. The spine portion and the at least two leg portions defining an I-shaped cross-section of each hub arm.

Alternatively or additionally, in this or other embodiments each hub arm is formed from two C-members. Each C-member includes a back and two element legs extending from the back. The backs are abutted to form the spine portion, and the element legs form the leg portions.

Alternatively or additionally, in this or other embodiments a first C-member extends from a first hub arm to a second hub arm, with the spool portion disposed between the first hub arm and the second hub arm.

Alternatively or additionally, in this or other embodiments the C-members are formed from a graphite-epoxy material.

Alternatively or additionally, in this or other embodiments the I-shaped cross-section is asymmetric relative to the spine portion.

Alternatively or additionally, in this or other embodiments a support plate is secured to the plurality of hub arms.

Alternatively or additionally, in this or other embodiments a blade clevis is positioned at each hub arm, a blade assembly securable to the blade clevis.

Alternatively or additionally, in this or other embodiments the blade clevis is supported by an inboard bearing and an outboard bearing.

Alternatively or additionally, in this or other embodiments the inboard bearing and/or the outboard bearing are elastomeric bearings.

In another embodiment, a rotor assembly for a rotary wing aircraft includes a rotor hub assembly including a spool portion and a plurality of hub arms extending radially outwardly from the spool portion. Each hub arm includes a spine portion and at least two leg portions extending from the spine portion. The spine portion and the at least two leg portions define an I-shaped cross-section of each hub arm. A rotor blade is secured to each hub arm of the plurality of hub arms.

Alternatively or additionally, in this or other embodiments each hub arm is formed from two C-members, each C-member including a back and two element legs extending from the back. The backs are abutted to form the spine portion, and the element legs forming the leg portions.

Alternatively or additionally, in this or other embodiments a first C-member extends from a first hub arm to a second hub arm, with the spool portion disposed between the first hub arm and the second hub arm.

Alternatively or additionally, in this or other embodiments the C-members are formed from a graphite-epoxy material.

Alternatively or additionally, in this or other embodiments the I-shaped cross-section is asymmetric relative to the spine portion.

Alternatively or additionally, in this or other embodiments a support plate secured to the plurality of hub arms.

Alternatively or additionally, in this or other embodiments a blade clevis is secured at each hub arm, the rotor blade secured to the blade clevis.

Alternatively or additionally, in this or other embodiments the blade clevis is supported by an inboard bearing and an outboard bearing.

Alternatively or additionally, in this or other embodiments the inboard bearing and/or the outer bearing are elastomeric bearings.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
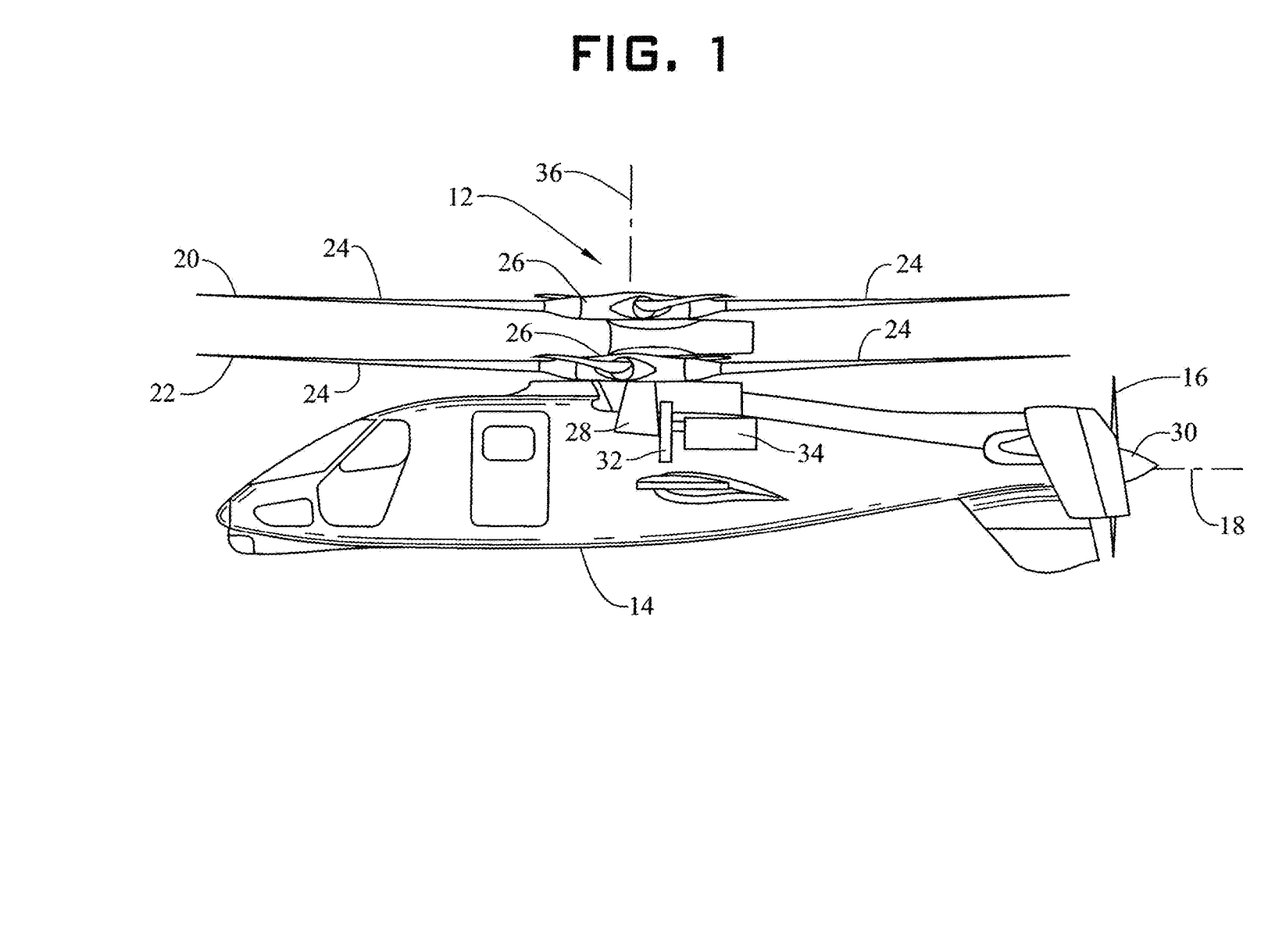
FIG. 1 is a general side view of an exemplary rotary wing aircraft for use in accordance with embodiments.

FIG. 1 illustrates an exemplary vertical takeoff and landing (VTOL) high speed compound or coaxial contra-rotating rigid rotor aircraft 10 having a dual, contra-rotating main rotor system 12, which rotates about a rotor axis 36. The aircraft 10 includes an airframe 14 which supports the dual, contra-rotating, coaxial main rotor system 12 as well as a translational thrust system 16 which provides translational thrust generally parallel to an aircraft longitudinal axis 18.

The main rotor system 12 includes an upper rotor system 20 and a lower rotor system 22 as dual contra-rotating main rotors in a coaxial configuration. A plurality of rotor blade assemblies 24 are mounted to a rotor hub assembly 26 of each rotor system 20, 22. The main rotor system 12 is driven by a transmission 28. The translational thrust system 16 may be any propeller system including, but not limited to a pusher propeller, a tractor propeller, a nacelle mounted propeller, etc. In the example of FIG. 1, the translational thrust system 16 includes an auxiliary propulsor 30. In an embodiment, the auxiliary propulsor 30 is a pusher propeller system with a propeller rotational axis oriented substantially horizontal and parallel to the aircraft longitudinal axis 18 to provide thrust for high speed flight. The translational thrust system 16 may be driven through a main gearbox 32 which also drives the main rotor system 12.

The transmission 28 includes the main gearbox 32 driven by one or more engines, illustrated schematically at 34. The main gearbox 32 and engines 34 are considered as part of the non-rotating frame of the aircraft 10. In the case of a rotary wing aircraft, the main gearbox 32 may be interposed between one or more gas turbine engines 34, the main rotor system 12 and the translational thrust system 16. In one embodiment, the main gearbox 32 is a split torque gearbox which carries torque from the engines 34 through a multitude of drivetrain paths. Although a particular rotary wing aircraft configuration is illustrated and described in the disclosed non-limiting embodiment, other configurations and/or machines with rotor systems are within the scope of the present invention. It is to be appreciated that while the description herein relates to a rotary wing aircraft with a dual coaxial contra-rotating rotor system, the disclosure herein may be as readily applied to other rotor systems, such as a conventional single rotor system.

Figure 2:
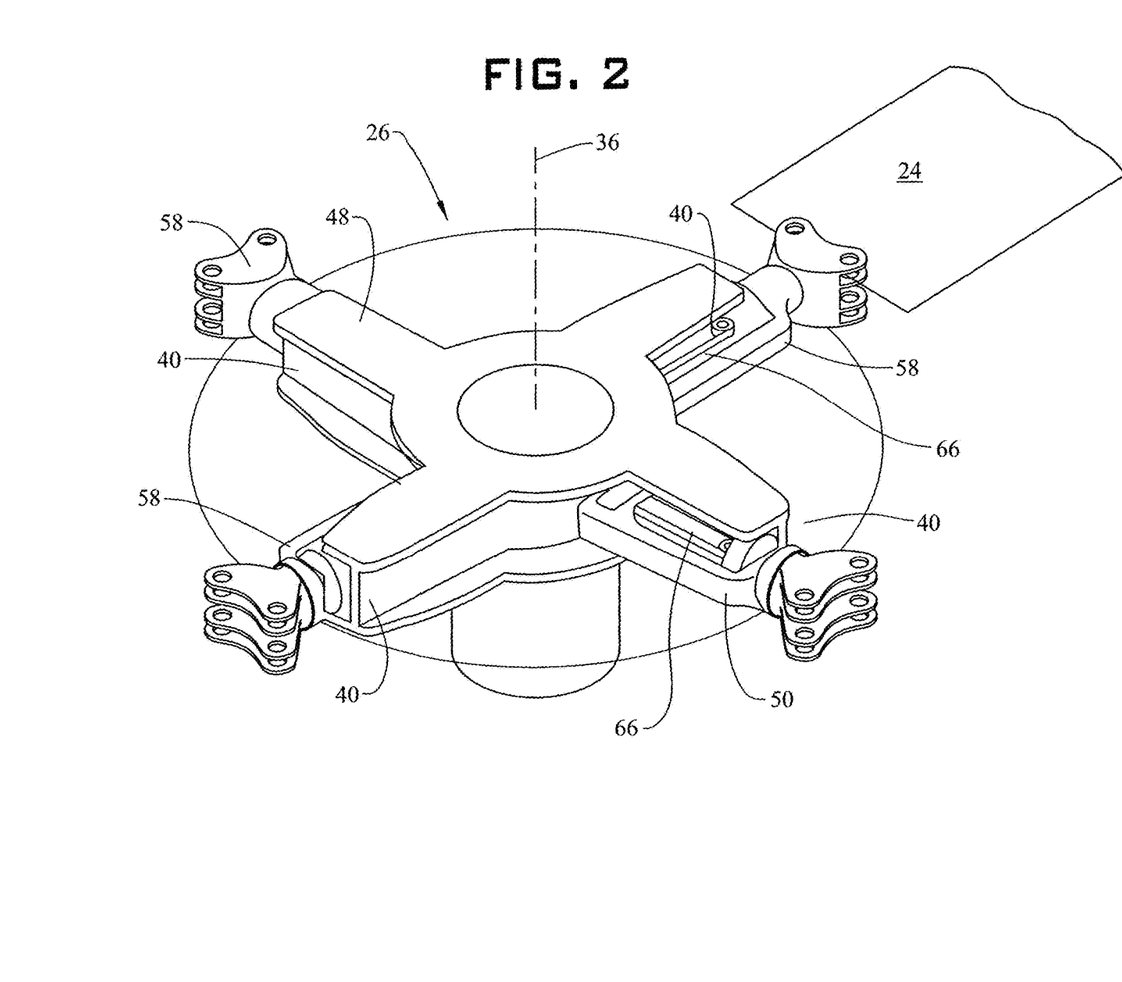
FIG. 2 is a perspective view of an embodiment of a rotor hub.

Referring now to FIG. 2, the rotor hub assembly 26 is located at, and rotates about, rotor axis 36. The hub assembly 26 includes a plurality of hub arms 40 extending radially outwardly from the rotor axis 36, with a rotor blade assembly 24 secured at each hub arm 40.

Figure 3:
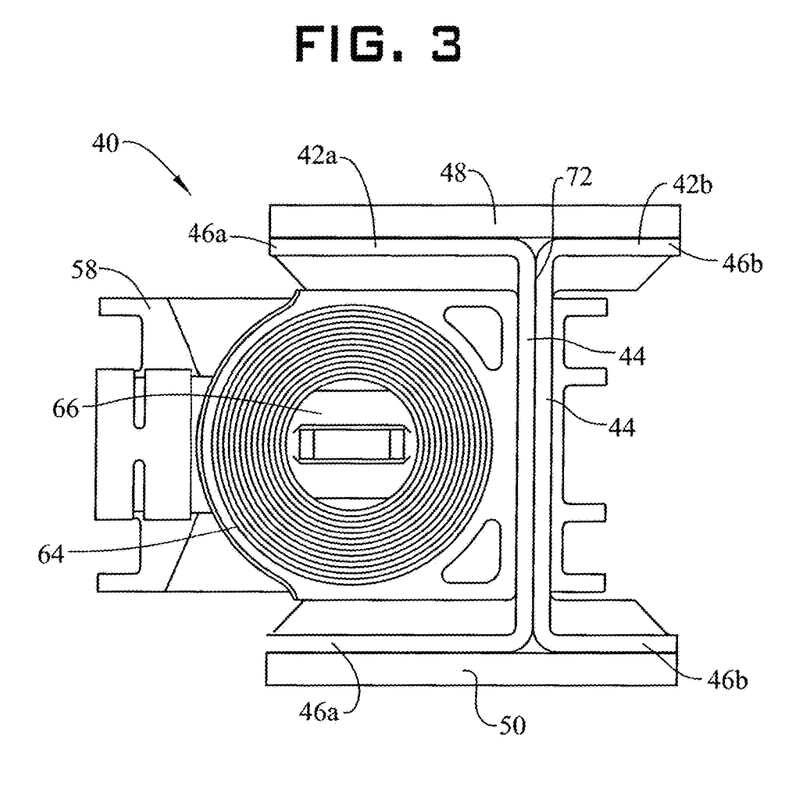
FIG. 3 is a cross-sectional view of an embodiment of a rotor hub arm.

Referring to FIG. 3, each hub arm 40 has an I-beam shaped cross-section, to react loading of the rigid rotor systems 20, 22. The hub arm 40 includes two C-members 42. Each C-member 42 comprises a member back 44 with two member legs 46 extending from the member back 44 in the same direction, in some embodiments perpendicular to the member back 44. The C-members 42 may be formed from a metallic or nonmetallic material, and in some embodiments are formed from a nonmetallic composite material such as a graphite epoxy material. To form the I-beam shaped cross-section of the hub arm 40, the C-members 42 are secured such that the member backs 44 of the adjacent C-members 42 abut forming an arm spine 72 In some embodiments, the C-members 42 are secured to each other by, for example, adhesives and/or mechanical fasteners. The member legs 46 of each C-member 42 may be of equal length, resulting in a symmetric hub arm 40, relative to an axis at member back 44. In other embodiments, as shown in FIG. 3, it may be desired to form an asymmetric hub arm 40, such that first member legs 46*a* of a first C-member 42*a* are of a different length, for example, longer, than second member legs 46*b* of second C-member 42*b*. In the embodiment of FIG. 3, the blade clevis 58 is disposed at the first C-member 46*a* as shown, or alternatively at the second C-member 46*b*. In some embodiments, an upper plate 48 and lower plate 50 are secured to the hub arm 40, for example, the member legs 46, to complete the hub assembly 26.

Figure 4:
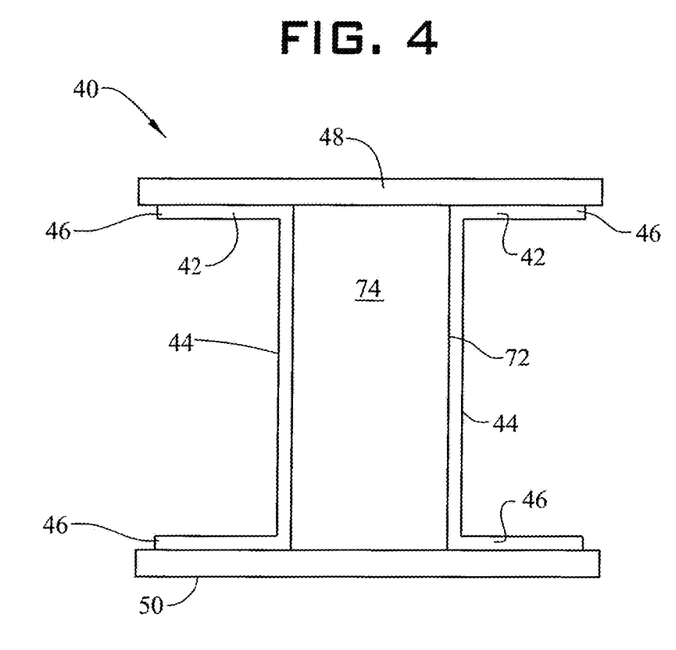
FIG. 4 is a cross-sectional view of another embodiment of a rotor hub arm.

Referring now to FIG. 4, in some embodiments the member backs 44 of the C-members 42 do not abut each other, leaving a gap 74 therebetween, at which the blade clevis 58 is located.

Figure 5:
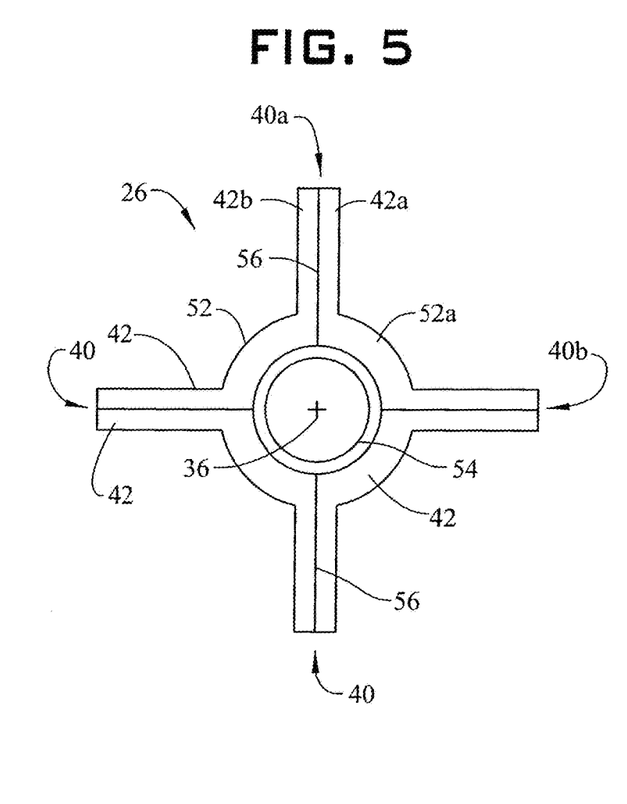
FIG. 5 is a plan view of an embodiment of a rotor hub.
Figure 6:
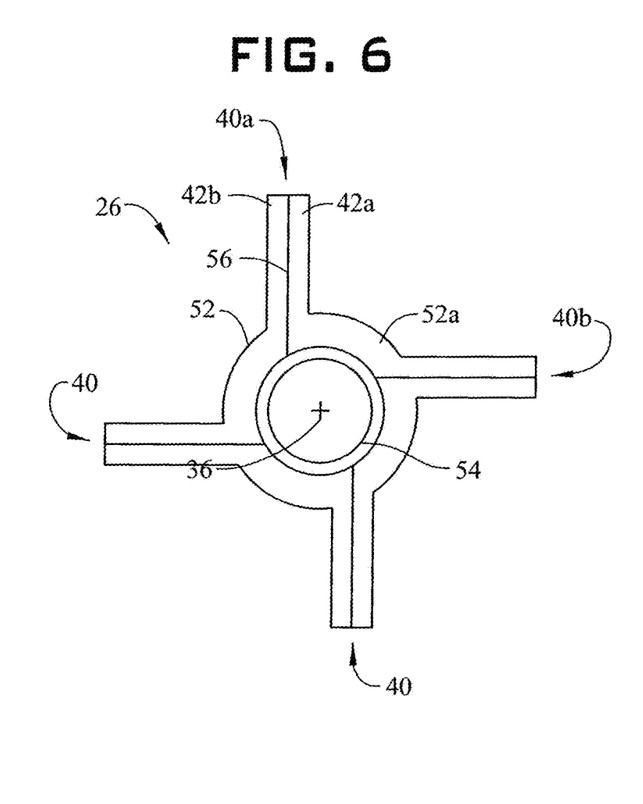
FIG. 6 is a plan view of another embodiment of a rotor hub.

Referring now to FIG. 5, illustrated is a plan view of an embodiment of a hub assembly 26. The hub assembly 26 includes four C-members 42. Each C-member 42 forms a portion of adjacent hub arms 40. For example, first C-member 42*a* forms a portion of both first hub arm 40*a* and second hub arm 40*b*, with hub arms 40*a* and 40*b* connected by spool portion 52*a*, which is formed integral with first C-member 42*a*. In such a hub assembly 26, the number of C-members 42 equals the number of hub arms 40 in the hub assembly 26. For additional support at the rotor axis 36, some embodiments of hub assembly 26 may include an inner spool portion 54 disposed radially inboard of spool portion 52 of each C-member 42. First C-member 42*a* and second C-member 42*b* are joined at arm joint 56, which in some embodiments, as shown in FIG. 5, extends through the rotor axis 36. In other embodiments, as shown in FIG. 6, the arm joint 56 is offset from the rotor axis 36.

Figure 7:
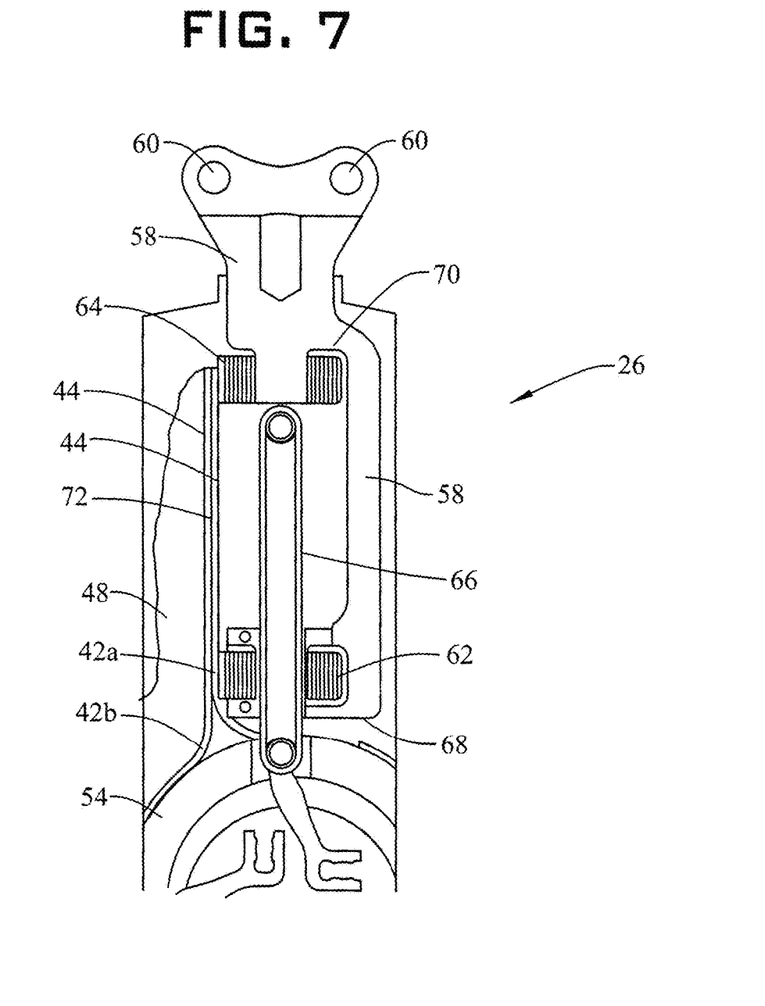
FIG. 7 is a plan view of an embodiment of a rotor hub arm.

Referring now to FIG. 7, more detail of the rotor blade assembly 24 attachment to the rotor hub assembly 26 is illustrated. The rotor blade assembly 24 is secured to a blade clevis 58 by, for example, a plurality of fasteners 60 such as bolts or screws. The blade clevis 58 is, in some embodiments, formed from a metal material such as titanium or a titanium alloy. The blade clevis 58 is supported in the hub arm 40 by an inboard bearing 62 and an outboard bearing 64 secured at the hub arm 40. In some embodiments, the inboard bearing 62 and the outboard bearing 64 are secured to the upper plate 48 and/or the lower plate 50 as well as the member legs 46 so as to react the blade assembly 24 loads into the C channels 42 via the blade clevis 58. In some embodiments, the bearings 62, 64 are elastomeric bearings. The blade clevis 58 is secured between the inboard bearing 62 and the outboard bearing 64 by a tension/torsion strap 66, shown as a Kevlar®, titanium, or MP-35N wire or rope encased in elastomer extending from an inner clevis portion 68 at the inboard bearing 62 to an outer clevis portion 70 at the outboard bearing 64. The tension/torsion strap 66 holds the blade clevis 58 under tension and accommodates blade pitch motions while reacting the centrifugal loads applied by the blade to the main rotor system 12. While not shown, the inner clevis portion 68 is connected at a mast which connects to the airframe 14 such that the tension from the strap 66 is reacted at the airframe 14.

While the invention has been described in detail in connection with only a limited number of embodiments, it should be readily understood that the invention is not limited to such disclosed embodiments. For instance, while described in terms of aircraft, it is understood that aspects could be used in other contexts such as for wind turbines, maritime propulsion, or other technologies in which a rotating element's plan of rotation will vary from perpendicular with the axis of rotation of a shaft driving the rotating element. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotor hub assembly for a rotary-winged aircraft comprising: a spool portion; and a plurality of hub arms extending radially outwardly from the spool portion, a rotor blade connectable to each hub arm, each hub arm including: a first C-member including a first back and two element legs extending from the first back, wherein the first C-member extends continuously from one of the plurality of hub arms to an adjacent one of the plurality of hub arms; a second C-member including a second back and two element legs extending from the second back, the first back abutting the second back to define a spine portion, wherein the second C-member extends continuously from the one of the plurality of hub arms to another adjacent one of the plurality of hub arms; and at least four leg portions extending from the spine portion, the at least four leg portions being defined by the two element legs of the first C-member and the two element legs of the second C-member, the spine portion and the at least four leg portions defining an I-shaped cross-section of each hub arm, wherein the first C-member extends from a first hub arm to a second hub arm defining the spool portion between the first hub arm and the second hub arm.

2. The rotor hub assembly of claim 1, wherein the C-members are formed from a graphite-epoxy material.

3. The rotor hub assembly of claim 1, wherein the I-shaped cross-section is asymmetric relative to the spine portion.

4. The rotor hub assembly of claim 1, further comprising a support plate secured to the plurality of hub arms.

5. The rotor hub assembly of claim 1, further comprising a blade clevis disposed at each hub arm, a blade assembly securable to the blade clevis.

6. The rotor hub assembly of claim 5, wherein the blade clevis is supported by an inboard bearing and an outboard bearing.

7. The rotor hub assembly of claim 6, wherein the inboard bearing and/or the outboard bearing are elastomeric bearings.

8. A rotor assembly for a rotary wing aircraft comprising: a rotor hub assembly including: a spool portion; and a plurality of hub arms extending radially outwardly from the spool portion, each hub arm including: a first C-member including a first back and two element legs extending from the first back, wherein the first C-member extends continuously from one of the plurality of hub arms to an adjacent one of the plurality of hub arms; a second C-member including a second back and two element legs extending from the second back, the first back abutting the second back to define a spine portion, wherein the second C-member extends continuously from the one of the plurality of hub arms to another adjacent one of the plurality of hub arms; and at least four leg portions extending from the spine portion, the at least four leg portions being defined by the two element legs of the first C-member and the two element legs of the second C-member, the spine portion and the at least—four leg portions defining an I-shaped cross-section of each hub arm, wherein the first C-member extends from a first hub arm to a second hub arm defining the spool portion between the first hub arm and the second hub arm; and a rotor blade secured to each hub arm of the plurality of hub arms.

9. The rotor assembly of claim 8, wherein the C-members are formed from a graphite-epoxy material.

10. The rotor assembly of claim 8, wherein the I-shaped cross-section is asymmetric relative to the spine portion.

11. The rotor assembly of claim 8, further comprising a support plate secured to the plurality of hub arms.

12. The rotor assembly of claim 8, further comprising a blade clevis disposed at each hub arm, the rotor blade secured to the blade clevis.

13. The rotor assembly of claim 12, wherein the blade clevis is supported by an inboard bearing and an outboard bearing.

14. The rotor assembly of claim 13, wherein the inboard bearing and/or the outboard bearing are elastomeric bearings.

15. The rotor assembly of claim 12 further comprising a tension/torsion strap holding the blade clevis under tension and accommodating rotor blade pitch motions while reacting the centrifugal loads applied by the rotor blade to rotor assembly.

16. A rotary wing aircraft comprising: an airframe; a rotor assembly supported by the airframe and including: a rotor hub assembly including: a spool portion; and a plurality of hub arms extending radially outwardly from the spool portion, each hub arm including: a first C-member including a first back and two element legs extending from the first back, wherein the first C-member extends continuously from one of the plurality of hub arms to an adjacent one of the plurality of hub arms; a second C-member including a second back and two element legs extending from the second back, the first back abutting the second back to define a spine portion, wherein the second C-member extends continuously from the one of the plurality of hub arms to another adjacent one of the plurality of hub arms; and at least four leg portions extending from the spine portion, the at least four leg portions being defined by the two element legs of the first C-member and the two element legs of the second C-member, the spine portion and the at least four leg portions defining an I-shaped cross-section of each hub arm, wherein the first C-member extends from a first hub arm to a second hub arm defining the spool portion between the first hub arm and the second hub arm; and a rotor blade secured to each hub arm of the plurality of hub arms.

* * * * *